United States Patent
Sakurai

(10) Patent No.: US 10,195,923 B2
(45) Date of Patent: Feb. 5, 2019

(54) VEHICLE AIR CONDITIONING UNIT

(71) Applicant: TOYOTA JIDOSHA KABUSHIKI KAISHA, Toyota-shi, Aichi (JP)

(72) Inventor: Hideyuki Sakurai, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 98 days.

(21) Appl. No.: 14/895,324

(22) PCT Filed: Jun. 2, 2014

(86) PCT No.: PCT/JP2014/065167
§ 371 (c)(1),
(2) Date: Dec. 2, 2015

(87) PCT Pub. No.: WO2015/005041
PCT Pub. Date: Jan. 15, 2015

(65) Prior Publication Data
US 2016/0121695 A1 May 5, 2016

(30) Foreign Application Priority Data

Jul. 12, 2013 (JP) .................................. 2013-147107

(51) Int. Cl.
*B60H 1/34* (2006.01)
*B60H 1/00* (2006.01)

(52) U.S. Cl.
CPC ....... *B60H 1/3414* (2013.01); *B60H 1/00564* (2013.01)

(58) Field of Classification Search
CPC .......................... B60H 1/3414; B60H 1/00564
(Continued)

(56) References Cited

U.S. PATENT DOCUMENTS 4,957,036 A   9/1990 Fujihara et al.
5,127,876 A   7/1992 Howe et al.
(Continued)

FOREIGN PATENT DOCUMENTS

CN   101684828 A   3/2010
DE   203 12 952 U1   10/2003
(Continued)

OTHER PUBLICATIONS

International Search Report for PCT/JP2014/065167 dated Sep. 22, 2014.

*Primary Examiner* — Steven B McAllister
*Assistant Examiner* — Allen Schult
(74) *Attorney, Agent, or Firm* — Sughrue Mion, PLLC

(57) ABSTRACT

A vehicle air conditioning unit is obtained that is capable of deflecting a blowing direction of an airflow blowing out from a blower outlet formed along a flow path. A movable shaft that supports a length direction other end portion of a guiding member is configured to be movable along the airflow flow direction. As a result, by turning movement of a lever, the movable shaft is slid, through a guide groove, along a vehicle width direction. The distance between the movable shaft and a fixed shaft thereby changes, changing the curvature of a front face of the guiding member, and enabling the airflow blowing out from a main flow blower outlet to be deflected along the vehicle width direction. Namely, the airflow blowing out from the main flow blower outlet is capable of being deflected toward the vehicle front-rear direction rear side, and toward the vehicle width direction.

5 Claims, 8 Drawing Sheets

(58) Field of Classification Search
USPC .......................................................... 454/152
See application file for complete search history.

(56) References Cited

U.S. PATENT DOCUMENTS

| | | | |
|---|---|---|---|
| 5,129,858 A | | 7/1992 | Komori et al. |
| 5,238,448 A | * | 8/1993 | Komori .................... B60H 1/34 454/155 |
| 2005/0136823 A1 | | 6/2005 | Metz |
| 2010/0226752 A1 | * | 9/2010 | Gammack ............... F04D 25/08 415/90 |
| 2010/0254800 A1 | | 10/2010 | Fitton et al. |
| 2011/0164959 A1 | | 7/2011 | Fitton et al. |
| 2015/0017902 A1 | | 1/2015 | Sakurai et al. |

FOREIGN PATENT DOCUMENTS

| | | |
|---|---|---|
| EP | 1 818 198 A1 | 8/2007 |
| JP | 62-44184 B2 | 9/1987 |
| JP | 2-136707 U | 11/1990 |
| JP | 7-36810 Y2 | 8/1995 |
| JP | 2000-255256 A | 9/2000 |
| JP | 2004-148965 A | 5/2004 |
| JP | 2005-035423 A | 2/2005 |
| JP | 2005-035465 A | 2/2005 |
| JP | 2005-212746 A | 8/2005 |
| JP | 2007-050781 A | 3/2007 |
| JP | 2007-203794 A | 8/2007 |
| JP | 2010-077969 A | 4/2010 |
| JP | 2013-040620 A | 2/2013 |
| WO | 03/072379 A1 | 9/2003 |
| WO | 2013/145172 A1 | 10/2013 |

* cited by examiner

FIG.4
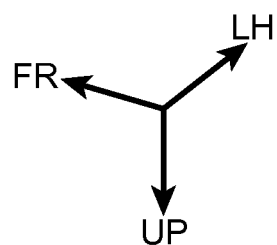
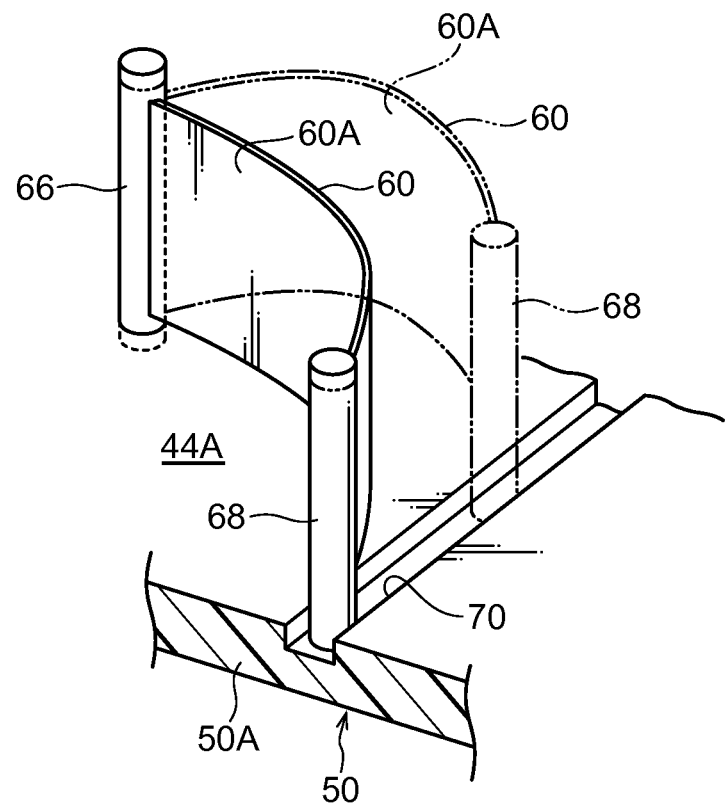

VEHICLE AIR CONDITIONING UNIT

CROSS REFERENCE TO RELATED APPLICATIONS

This application is a National Stage of International Application No. PCT/JP2014/065167 filed Jun. 2, 2014, claiming priority based on Japanese Patent Application No. 2013-147107 filed Jul. 12, 2013, the contents of all of which are incorporated herein by reference in their entirety.

TECHNICAL FIELD

The present invention relates to a vehicle air conditioning unit employed in a vehicle.

BACKGROUND ART

For example, Patent Documents 1 and 2 describe a vehicle air conditioning unit that collides conditioned airflow respectively blowing out from two blower outlets, and changes the flow direction of the conditioned airflow. Moreover, Patent Document 3 describes technology in which, in a vehicle air conditioning unit, conditioned airflow blowing out from an instrument panel is led toward the vehicle front-rear direction rear side. Furthermore, Patent Document 4 describes technology in which, using the Coandă effect, blasted air exceeds an amount of air blowing out from a nozzle in a blower.

Patent Document 1: Japanese Patent Application Laid-Open (JP-A) No. 2007-050781
Patent Document 2: JP-A 2004-148965
Patent Document 3: JP-A 2005-035423
Patent Document 4: JP-A 2010-077969

SUMMARY OF INVENTION

Technical Problem

However, in the such related technology, the blow direction of the airflow blowing out from the blower outlet is constant, and so there is margin for improvement in order to deflect the airflow.

In consideration of the above circumstances, the present invention provides a vehicle air conditioning unit capable of deflecting a blow direction of an airflow blowing out from an blower outlet formed along a flow path.

Solution to Problem

A vehicle air conditioning unit of a first aspect includes: a fan that operates to generate an airflow; a flow path member that guides the airflow generated by the fan along one direction, and that includes a blower outlet formed along the one direction; and an airflow deflection member that is disposed inside the flow path member at an orientation intersecting with the one direction, that includes a guiding member guiding at least a portion of the airflow toward the blower outlet, and that deflects an airflow blowing out from the blower outlet to along the one direction by deforming the guiding member.

The vehicle air conditioning unit of the first aspect includes the flow path member that guides the airflow generated by the fan along the one direction. The blower outlet is formed to the flow path member along the one direction. The airflow deflection member is also provided inside the flow path member. The airflow deflection member includes the guiding member disposed at the orientation intersecting with the one direction (the flow direction of the airflow). As a result, the airflow guided within the flow path member is deflected by the guiding member toward the direction intersecting with the flow direction of the airflow and is guided toward the blower outlet. As this occurs, deformation of the guiding member enables the airflow blowing out from the blower outlet to be deflected along the one direction.

Specifically, when the flow path member is, for example, formed along the vehicle width direction, the airflow is guided along the vehicle width direction (the one direction). Since the guiding member is disposed in a state intersecting with the flow direction of the airflow, this means that the guiding member is disposed along the vehicle front-rear direction and the vehicle up-down direction. As a result, the airflow flowing along the vehicle width direction inside the flow path member hits the guiding member, is deflected toward the vehicle front-rear direction and the vehicle up-down direction, and is guided toward the blower outlet side. As this occurs, deforming the guiding member enables the airflow blowing out from the blower outlet to be deflected toward the direction along the vehicle width direction through the process of being guided along a front face of the guiding member.

A vehicle air conditioning unit of a second aspect is the vehicle air conditioning unit of the first aspect, in which the airflow deflection member includes: one shaft portion that is provided to the guiding member at one end portion of the airflow deflection member along a direction intersecting with the one direction, and that supports the guiding member; another shaft portion that is provided to the guiding member at another end portion of the airflow deflection member along the direction intersecting with the one direction, and that supports the guiding member; and a movement member that moves at least one of the one shaft portion or the other shaft portion along the one direction, and changes a curvature of a front face of the guiding member.

In the vehicle air conditioning unit of the second aspect, the airflow deflection member includes the one shaft portion and the other shaft portion that support the guiding member, and the movement member that moves at least one of the one shaft portion or the other shaft portion. The one shaft portion of the airflow deflection member is provided to the guiding member at the one end portion along the direction intersecting with the one direction (the flow direction of the airflow), and the other shaft portion of the airflow deflection member is provided to the guiding member at the other end portion along the direction intersecting with the one direction. At least one of the one shaft portion or the other shaft portion are capable of movement along the one direction using the movement member. Movement of at least one of the one shaft portion or the other shaft portion changes the distance between the one shaft portion and the other shaft portion, changing the curvature of the front face.

Changing the curvature of the guiding member surface in this way, enables the airflow that is deflected toward the direction intersecting with the airflow flow direction (the one direction) to be further deflected along the one direction. Since at least one of the one shaft portion or the other shaft portion move along the one direction, the flow rate of the deflected airflow can be made approximately constant irrespective of the deformation amount of the guiding member, without a portion of the guiding member overlapping another portion of the guiding member due to movement of the shaft portion, when viewed from the airflow flow direction.

A vehicle air conditioning unit of a third aspect is the vehicle air conditioning unit of the second aspect, in which the one shaft portion is a fixed shaft disposed at the blower outlet side, and the other shaft portion is a movable shaft that is movable with respect to the fixed shaft.

In the vehicle air conditioning unit of the third aspect, the fixed shaft is disposed at the blower outlet side that serves as the outlet of the deflected airflow, thereby enabling greater suppression of blow-out noise occurring compared to cases in which the movable shaft is disposed at the blower outlet side. "Blow-out noise" used herein refers to noise occurring, for example, due to differences in strength or turbulence of air blown out due to narrowing and widening of the blower outlet.

A vehicle air conditioning unit of a fourth aspect is the vehicle air conditioning unit of the third aspect, in which the movement member includes: a guide portion that is formed along the one direction to a wall face configuring a portion of the flow path member, and with which an end portion of the movable shaft engages; and an operating portion that is connected to the movable shaft, that is provided to a unit main body and that moves the movable shaft along the guide portion.

In the vehicle air conditioning unit of the fourth aspect, the movement member includes the guide portion that guides the moveable shaft, and the operating portion that moves the movable shaft. The guide portion is formed along the airflow flow direction (the one direction) to the wall face configuring a portion of the flow path member, and the end portion of the movable shaft engages with the guide portion. Moreover, the operating portion is connected to the movable shaft, and moves the movable shaft along the guide portion provided to the unit main body.

As a result, when the operating portion is operated, the movable shaft moves, through the guide portion, along the one direction. This thereby changes the distance of the movable shaft with respect to the fixed shaft, changing the curvature of the guiding member. Note that "connected" referred to herein includes, as well as cases in which there is a direct connection between the movable shaft and the operating portion, also cases in which there is an indirect connection.

A vehicle air conditioning unit of a fifth aspect is the vehicle air conditioning unit of any one of the first aspect to the fourth aspect, in which the vehicle air conditioning unit is configured that the airflow blowing out from the blower outlet flows along a front face of a unit main body.

In the vehicle air conditioning unit of the fifth aspect, the configuration is such that the airflow blowing out from the blower outlet flows along the front face of the unit main body. As a result, what is referred to as the Coandă effect can be utilized through the process of the airflow flowing over the front face of the unit main body. Surrounding air is thereby drawn in due to a drawing-in phenomenon, enabling the blown air flow rate to be increased.

A vehicle air conditioning unit of a sixth aspect is the vehicle air conditioning unit of the fifth aspect, in which the vehicle air conditioning unit includes another blower outlet that is disposed to the unit main body opposing the blower outlet, and that blows out an airflow that intersects with the airflow blowing out from the blower outlet.

In the vehicle air conditioning unit of the sixth aspect, the other blower outlet is provided to the unit main body opposing the blower outlet. The other blower outlet is set so as to blow out airflow which intersects with the airflow blowing out from the blower outlet and flowing along the front face of the unit main body. Intersection (convergence) of the airflow blowing out from the blower outlet with the airflow blowing out from the other blower outlet in this way changes the flow direction of the airflow blowing out from the blower outlet. As a result, no separate fin or the like is required to adjust the flow direction.

Advantageous Effects of Invention

As explained above, the vehicle air conditioning unit of the first aspect exhibits the excellent advantageous effect of deflecting the airflow direction of the airflow flowing out from the blower outlet formed along the flow path.

The vehicle air conditioning unit of the second aspect exhibits the excellent advantageous effect of enabling the curvature of the guiding member front face to be changed using a simple configuration.

The vehicle air conditioning unit of the third aspect exhibits the excellent advantageous effect of enabling occurrence of the blow-out noise to be suppressed by disposing the fixed shaft at the blower outlet side.

The vehicle air conditioning unit of the fourth aspect exhibits the excellent advantageous effect of enabling the curvature of the guiding member front face to be easily changed, by operating the operating portion and moving the movable shaft along the airflow flow direction.

The vehicle air conditioning unit of the fifth aspect exhibits the excellent advantageous effect of enabling the blown air flow rate to be increased by utilizing the Coandă effect.

The vehicle air conditioning unit of the sixth aspect exhibits the excellent advantageous effect of enabling the flow direction of the airflow blowing out from the blower outlet to be changed by convergence with the airflow blowing out from the other blower outlet.

BRIEF DESCRIPTION OF DRAWINGS

FIG. 4 is a partial enlarged perspective view illustrating relevant portions of a vehicle air conditioning unit of the present exemplary embodiment.

DESCRIPTION OF EMBODIMENTS

Explanation follows regarding a vehicle air conditioning unit according to an exemplary embodiment of the present invention, with reference to the drawings. Note that, the front-rear, left-right and up-down directions used in the below explanation indicate the front-rear, left-right and up-down directions as viewed by an occupant seated in a vehicle seat, and that in each of the drawings, as appropriate, the arrow FR indicates the vehicle front direction, the arrow UP indicates the vehicle upward direction, the arrow RH indicates the vehicle right direction and the arrow LH indicates the vehicle left direction.

<Vehicle Air Conditioning Unit Configuration>

Figure 7:
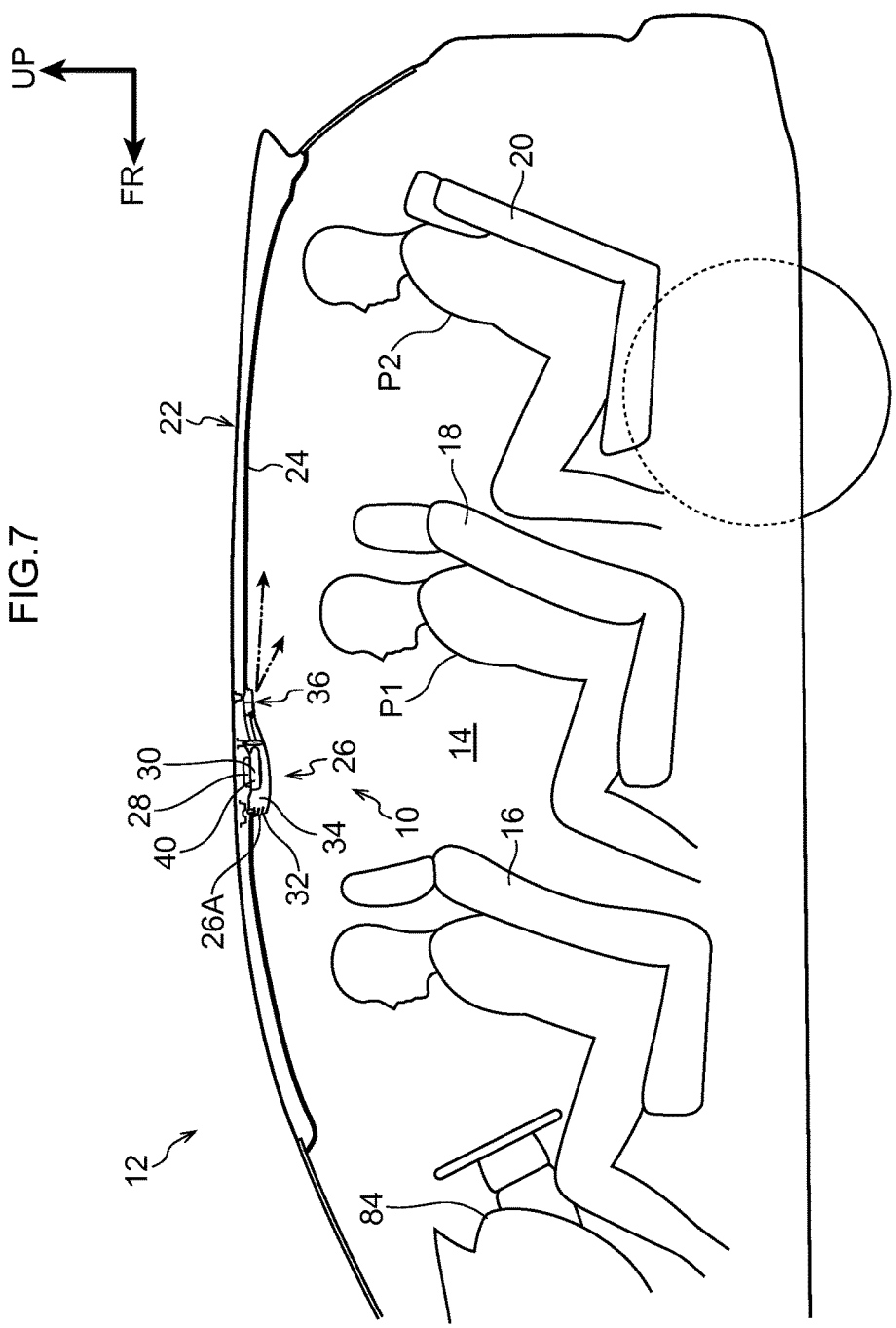
FIG. 7 is a partial cross-section view of a vehicle installed with a vehicle air conditioning unit of the present exemplary embodiment, in a state viewed from the vehicle side.

As illustrated in FIG. 7, a vehicle 12 provided with a vehicle air conditioning unit 10 of the present exemplary embodiment is, for example, what is referred to as a minivan type vehicle with three rows of seats. A cabin 14 of the vehicle 12 is provided with seats 16, 18, 20 in the order of the first row, the second row and the third row respectively. The first row of seats 16 is the driver's seat and the front passenger seat, and the second row of seats 18 and the third row of seats 20 are, for example, bench type seats that are each capable of seating three occupants.

The vehicle air conditioning unit 10 is attached at a vehicle ceiling portion between the first row of seats 16 and the second row of seats 18 (hereafter simply referred to as "ceiling portion") 22. An open portion 24A (refer to FIG. 1) that forms a T shape as viewed from a below (the cabin 14 side) is formed to a roof head lining 24 that configures the vehicle ceiling portion 22, and a fan cover 26 is attached to an inner edge portion of the open portion 24A. Namely the fan cover 26 is exposed to the cabin 14 side through the open portion 24A.

The vehicle air conditioning unit 10 is provided with, for example, a motor 28, and a fan 30 that rotates and creates an airflow due to operation of the motor 28, and the motor 28 and the fan 30 are covered by the fan cover 26. The motor 28 and the fan 30 are accordingly not exposed to the cabin 14 side.

The fan 30 is disposed at a vehicle width direction center portion, and a front wall portion 26A positioned on the fan cover 26 at the vehicle front-rear direction front side of the fan 30 is provided with an air inlet 32 through which air is introduced by rotation of the fan 30. A flow path 34 configured by the fan cover 26 links between the air inlet 32 and the fan 30.

Figure 1:
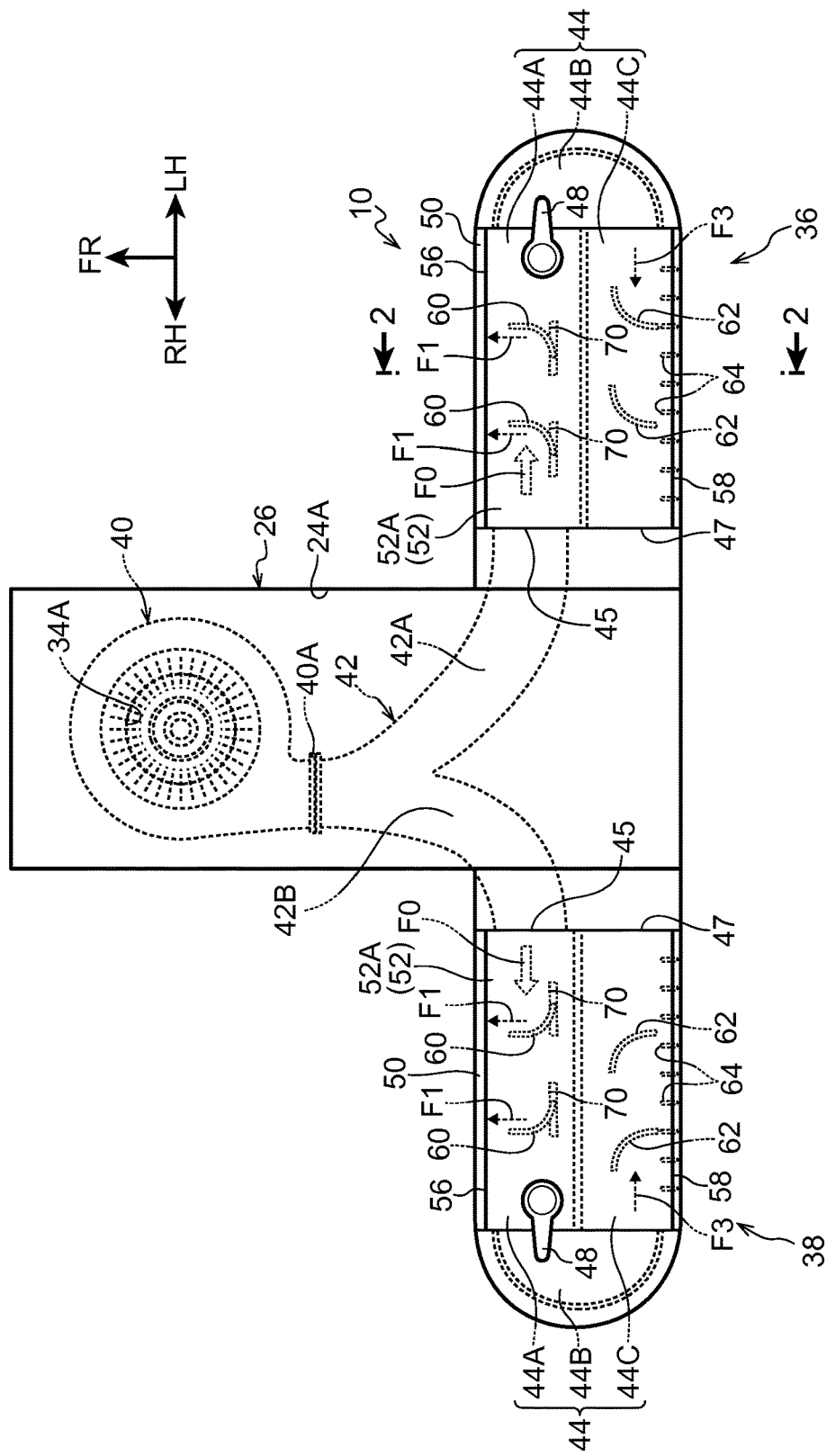
FIG. 1 is a plan view of a vehicle air conditioning unit of an exemplary embodiment, viewed from below the vehicle.

As illustrated in FIG. 1, blower portions 36, 38 serving as flow path members are respectively provided to the fan cover 26 at a vehicle front-rear direction rear side of the fan 30. The blower portions 36, 38 extend toward the vehicle width direction outsides, with the fan 30 at the center. The fan 30 is covered by a shroud 40. A flange portion 40A is provided to the shroud 40, and a base portion of a Y shaped duct 42, configured including a first duct portion 42A and a second duct portion 42B that respectively branch toward the left and right in the vehicle width direction, is coupled to the flange portion 40A.

The first duct portion 42A curves toward the vehicle width direction left side and is coupled to the blower unit 36, and the second duct portion 42B curves toward the vehicle width direction right side and is coupled to the blower portion 38. Note that, since configuration of the blower portion 38 is substantially the same as configuration of the blower unit 36, configuration of the blower unit 36 is explained herein, and explanation regarding the blower portion 38 is omitted.

The blower unit 36 is provided with a substantially U shaped flow path 44 that opens to the vehicle width direction inside. The flow path 44 is configured including: a first flow path 44A that extends toward the vehicle width direction outside; a second flow path 44B that bends back in a substantial U shape from a vehicle width direction outside end portion of the first flow path 44A toward the vehicle rear side and the vehicle width direction inside; and a third flow path 44C that extends from a vehicle width direction inside end portion of the second flow path 44B toward the vehicle width direction inside.

The second duct portion 42B is coupled to a vehicle width direction inside end portion 45 of the first flow path 44A, positioned at a starting end portion of the flow path 44, and an airflow F0 is introduced from the fan 30. Moreover, a vehicle width direction inside end portion 47 of the third flow path 44C positioned at a finishing end portion of the flow path 44 is configured as a closed end. Furthermore, a damper 48 is provided to the blower unit 36 to adjust the flow rate of an airflow F3 that flows from the first flow path 44A through the second flow path 44B into the third flow path 44C.

Figure 2:
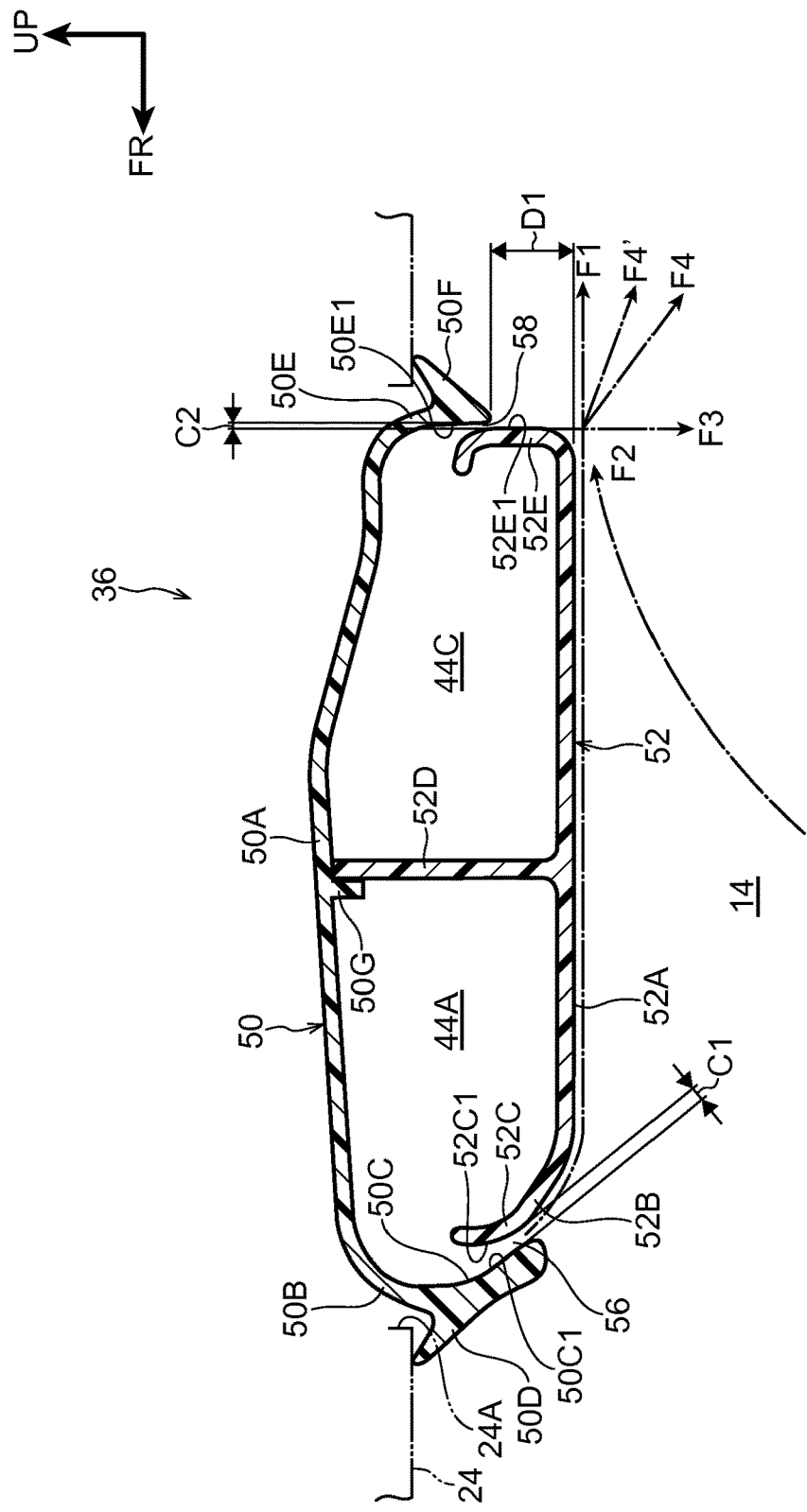
FIG. 2 is an enlarged cross-section view illustrating a cross-section of the vehicle air conditioning unit, taken along line 2-2 in FIG. 1.

Detailed explanation follows regarding configuration of the blower unit 36. As illustrated in FIG. 2, the blower unit 36 is configured with an upper/lower two part structure of an upper structure body 50 and a lower structure body 52 that serves as the unit main body, with both formed using a resin material. The upper structure body 50 opens downwards, and the lower structure body 52 opens upwards, in a configuration such that the upper structure body 50 covers the lower structure body 52.

An upper wall section 50A is provided to the upper structure body 50 that configures upper section of the blower unit 36 so as to extend in the vehicle front-rear direction and the vehicle width direction. A front wall section 50B is provided to a front end portion of the upper wall section 50A so as to curve towards the lower side. An inclined wall section 50C extends from a lower end portion of the front wall section 50B so as to incline toward the vehicle rear side. A contact tab 50D extends from a lower end portion of the inclined wall section 50C, curving toward the vehicle front-rear direction front side and upper side such that the contact tab 50D is capable of contact with a portion at the periphery of the open portion 24A formed to the roof head lining 24.

Moreover, a rear wall section 50E is provided to a rear end portion of the upper wall section 50A so as to curve toward the lower side. A contact tab 50F extends from a lower end portion of the rear wall section 50E so as to curve toward the vehicle front-rear direction rear side and upper side such that the contact tab 50F is capable of contact with a portion at the periphery of the open portion 24A formed to the roof head lining 24. Furthermore, a rib 50G is provided to a vehicle front-rear direction center portion of the upper wall section 50A so as to protrude toward the lower side and extend in the vehicle width direction.

A lower wall section 52A is provided to the lower structure body 52 that configures the lower section of the blower unit 36 so as to extend in the vehicle front-rear direction and the vehicle width direction. An inclined wall section 52B is provided to a front end portion of the lower wall section 52A so as to curve toward the upper side. An inclined wall section 52C extends from a front end portion of the inclined wall section 52B and curves toward the upper side, so as to face the inclined wall section 50C of the upper structure body 50 along the vehicle front-rear direction and form an overlapping portion with the inclined wall section 50C. A specific distance C1 (explained later) is provided between a vehicle front-rear direction front side front wall face 52C1 of the inclined wall section 52C and a vehicle front-rear direction rear side rear wall face 50C1 of the inclined wall section 50C.

Moreover, a rear wall section 52E extends from a rear end portion of the lower wall section 52A so as to curve toward the upper side and face the rear wall section 50E of the upper structure body 50 along the vehicle front-rear direction. A specific distance C2 (explained later) is provided between a vehicle front-rear direction rear side rear wall face 52E1 of the rear wall section 52E and a vehicle front-rear direction front side front wall face 50E1 of the rear wall section 50E. Furthermore, a partitioning wall section 52D is provided to a vehicle front-rear direction center portion of the lower wall section 52A so as to protrude toward the upper side, with a leading end portion of the partitioning wall section 52D extending along the rib 50G of the upper structure body 50.

As explained above, the first flow path 44A is formed by the upper wall section 50A, the front wall section 50B, and the inclined wall section 50C of the upper structure body 50, and by the partitioning wall section 52D, the lower wall section 52A, the inclined wall section 52B, and the inclined wall section 52C of the lower structure body 52. Moreover, the third flow path 44C is formed by the upper wall section 50A, and the rear wall section 50E of the upper structure body 50, and by the partitioning wall section 52D, the lower wall section 52A, and the rear wall section 52E of the lower structure body 52. Furthermore, the second flow path 44B (refer to FIG. 1) is formed by sections such as the upper wall section 50A of the upper structure body 50, and the lower wall section 52A of the lower structure body 52.

As described, the specific distance C1 is provided to the blower unit 36 between the rear wall face 50C1 of the inclined wall section 50C provided to the upper structure body 50, and the front wall face 52C1 of the inclined wall section 52C provided to the lower structure body 52. This thereby forms a main-flow blower outlet 56, serving as a blower outlet. The main-flow blower outlet 56 opens diagonally toward a vehicle rear side, and is formed as an elongated hole shape with length direction along the vehicle width direction (refer to FIG. 1).

Moreover, the specific distance C2 is provided between the front wall face 50E1 of the rear wall section 50E provided to the upper structure body 50, and the rear wall face 52E1 of the rear wall section 52E provided to the lower structure body 52. This thereby forms a flow direction adjustment-flow blower outlet 58, serving as another blower outlet. The flow direction adjustment-flow blower outlet 58 opens downwards, and is formed as an elongated hole shape with length direction along the vehicle width direction (refer to FIG. 1).

In this way, as illustrated in FIG. 1, the main-flow blower outlet 56 and the flow direction adjustment-flow blower outlet 58 are disposed to the blower unit 36 opposing each other in the vehicle front-rear direction. Specifically, the main-flow blower outlet 56 is provided to the blower unit 36 at a vehicle front-rear direction front portion, and the flow direction adjustment-flow blower outlet 58 is provided to the blower unit 36 at a vehicle front-rear direction rear portion. The airflow F0 that flows from the fan 30 through the duct 42 and into the blower unit 36 is blown out of the main-flow blower outlet 56 and the flow direction adjustment-flow blower outlet 58, respectively.

Furthermore, in the present exemplary embodiment, as illustrated in FIG. 2, setting is such that an airflow F1 blown out from the main-flow blower outlet 56 flows from the front wall face 52C1 of the inclined wall section 52C of the lower structure body 52 along a front face of the lower wall section 52A, and intersects with an airflow F3 that is blown out from the flow direction adjustment-flow blower outlet 58 to the lower side. Moreover, the flow direction adjustment-flow blower outlet 58 is disposed at an upward distance amount of distance D1 from the vehicle up-down direction height position of the lower wall section 52A of the lower structure body 52. Furthermore, the flow direction adjustment-flow blower outlet 58 is disposed at an upward distance amount of the distance D1 from the lower wall section 52A of the lower structure body 52.

In the present exemplary embodiment, as illustrated in FIG. 1, plural guiding members 60 are provided to the first flow path 44A side of the lower wall section 52A of the lower structure body 52 so as to be disposed along the airflow F0 flow direction. The guiding members 60 configure a portion of an airflow deflection member for guiding the airflow F0 flowing into the blower unit 36 toward the main-flow blower outlet 56. Plural guide ribs 62, 64 are also provided to the third flow path 44C side of the lower wall section 52A of the lower structure body 52 so as to be disposed along the airflow F3 flow direction to guide the airflow F3 toward the flow direction adjustment-flow blower outlet 58.

Figure 3:
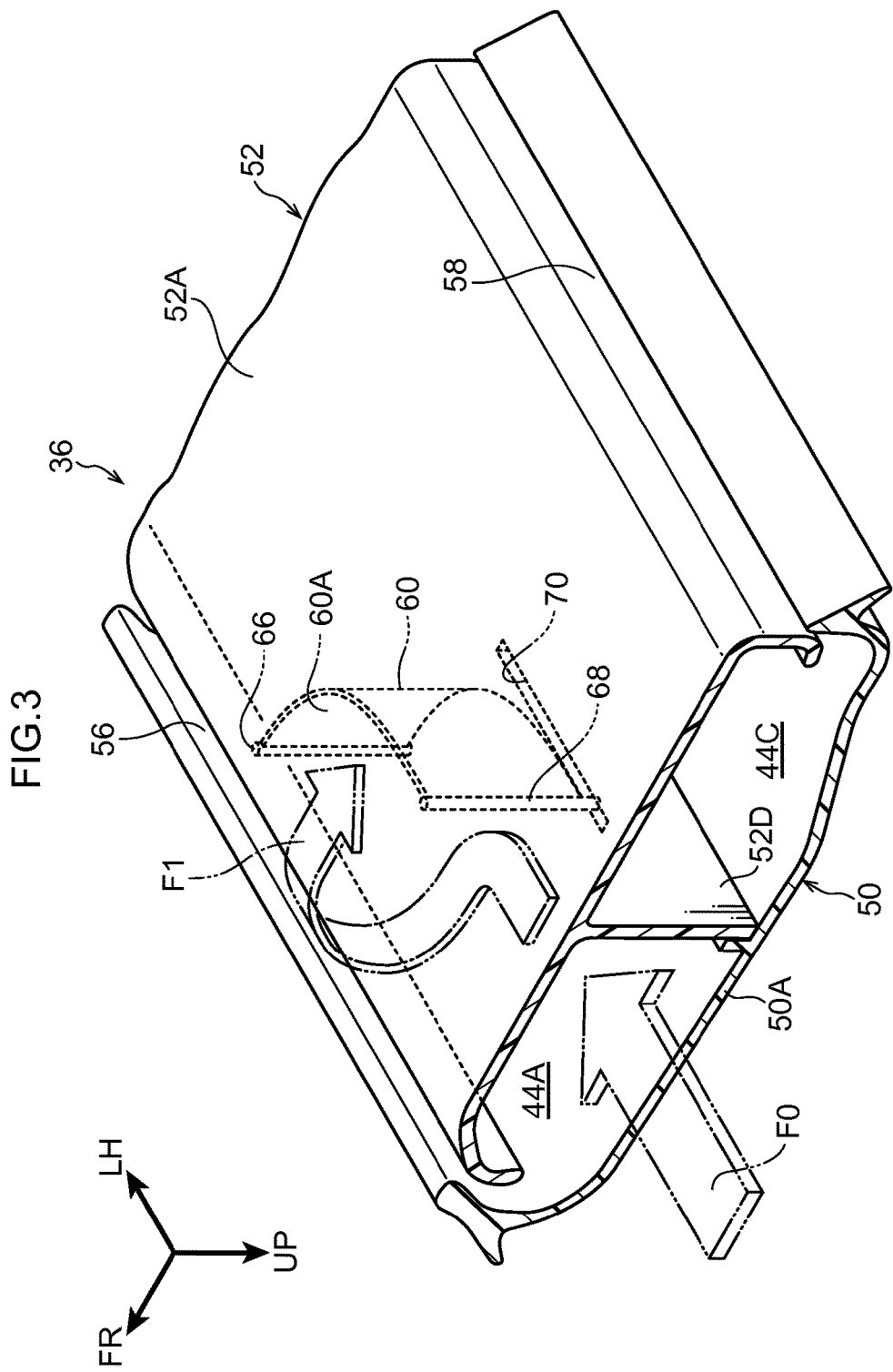
FIG. 3 is an enlarged perspective cross-section view illustrating relevant portions of a vehicle air conditioning unit of the present exemplary embodiment, viewed from diagonally below the vehicle.

As illustrated in FIG. 3, the guiding members 60 are configured as thin plate shapes that have a rectangular profile when viewed along the airflow F0 flow direction, not illustrated in the drawing, with their length directions orthogonal to the airflow F0. The guiding members 60 are formed of a resilient member such as a rubber member or a synthetic resin, and are formed so as being capable of resilient deformation.

As illustrated in FIG. 4, a fixed shaft 66, configuring a portion of the airflow deflection member, is attached to one length direction end portion of the guiding member 60, with the fixed shaft 66 fixed in the vicinity of the main-flow blower outlet 56. A movable shaft 68, configuring a portion of the airflow deflection member, is also attached to the other length direction end portion of the guiding member 60.

The movable shaft 68 is disposed at the vehicle front-rear direction rear side of the fixed shaft 66, and the guiding member 60 is disposed in the first flow path 44A along at direction intersecting with the airflow F0 flow direction (one direction). Guide grooves 70, serving as guide portions, are formed along the vehicle width direction to both the lower wall section 52A of the lower structure body 52 and the upper wall section 50A of the upper structure body 50, with both end portions of the movable shaft 68 capable of engaging with the guide grooves 70. The movable shafts 68 are thereby capable of moving along the airflow F0 flow direction. Note that the guide grooves at the lower wall section 52A side are omitted from the drawings.

Figure 5:
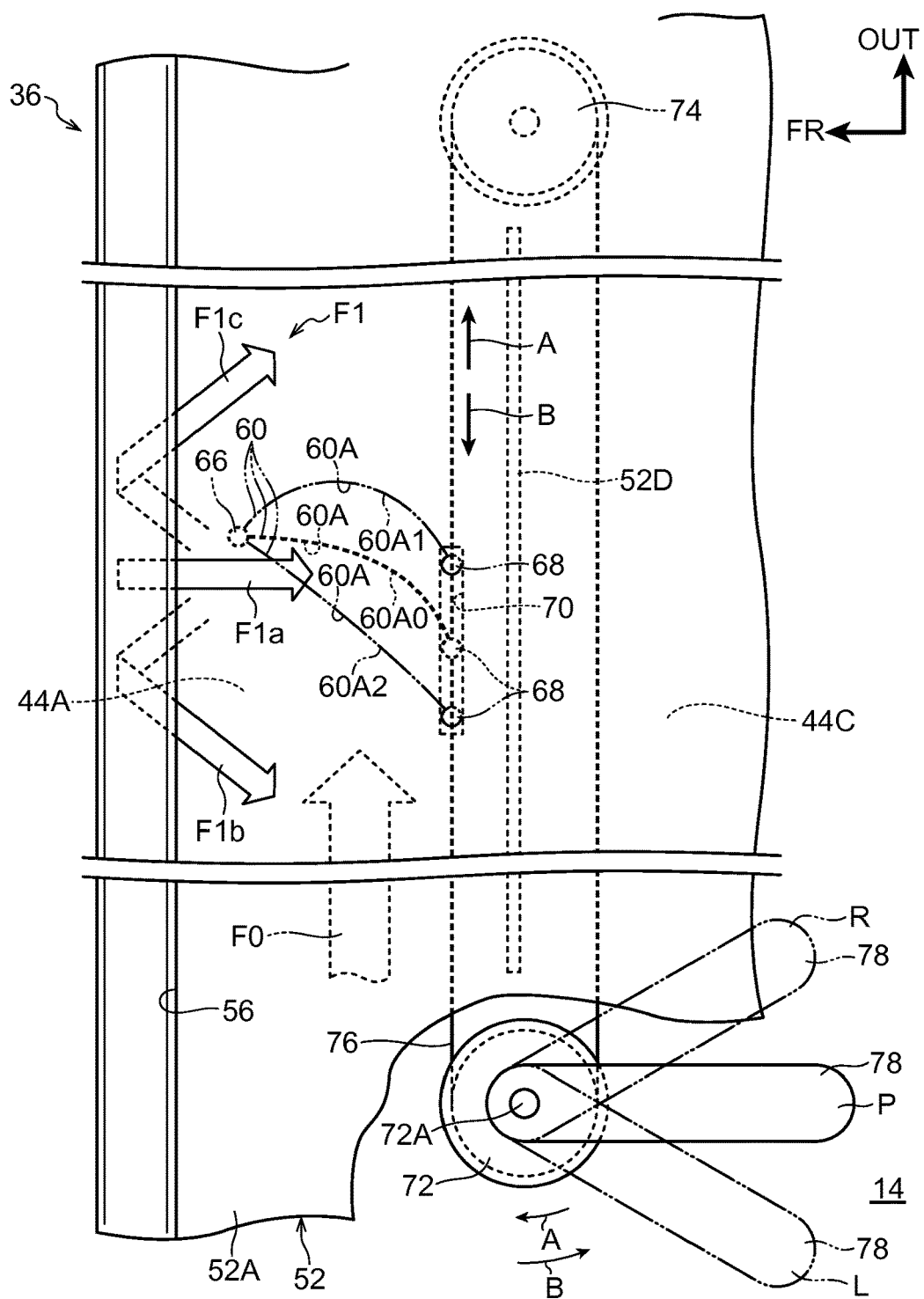
FIG. 5 is a plan view illustrating relevant portions of a vehicle air conditioning unit of the exemplary embodiment, viewed from below the vehicle.

As illustrated in FIG. 5, fixed pulleys 72, 74, configuring portions of a shifting means at the upstream side and the downstream side in the airflow F0 flow movement direction, are respectively disposed at a vehicle front-rear direction rear portion of the first flow path 44A. An endless shaped cord 76 is attached to a lower end portion of each of the movable shafts 68, and the cord 76 and entrained around the fixed pulleys 72, 74. A lever 78, that is disposed to the lower structure body 52 and exposed to the cabin 14 side, is coupled to a rotation shaft 72A of the fixed pulley 72. Through the rotation shaft 72A, the fixed pulley 72 undergoes rotational movement by turning the lever 78.

Through the cord 76, the fixed pulley 74 undergoes rotational movement due to rotational movement of the fixed pulley 72. When this occurs, the cord 76 between the fixed pulley 72 and the fixed pulley 74 slides, and through the cord 76, each movable shaft 68 thereby slides along the respective guide groove 70. Namely, rotational movement of the lever 78 and the fixed pulleys 72, 74 is converted, through the cord 76, to linear (sliding) movement by the movable shaft 68. The distance between the movable shaft 68 and the fixed shaft 66 changes due to the sliding movement of the movable shaft 68, thereby changing the curvature of a face 60A of the guiding member 60.

<Operation and Advantageous Effects of the Present Exemplary Embodiment>

Explanation follows regarding operation and advantageous effects of the present exemplary embodiment.

Explanation first follows regarding an airflow in the vehicle air conditioning unit 10. The airflow is generated by operation of the motor 28 rotating the fan 30 illustrated in FIG. 7. Namely, air inside the cabin 14 is taken in from the air inlet 32 formed to the vehicle front-rear direction front end portion of the fan cover 26. Next, the air taken in from the air inlet 32 flows inside the flow path 34 configured by the fan cover 26, and is introduced to an axial center portion of the fan 30 from an opening portion 34A (refer to FIG. 1) formed to a lower portion of the shroud 40. Next, as illustrated in FIG. 1, the air introduced to the axial center portion of the fan 30 branches from the duct 42 to the first duct portion 42A and the second duct portion 42B, and then flows respectively to the blower portions 36, 38.

As previously described, the blower unit 36 (this also applies to the blower portion 38) is configured including the main-flow blower outlet 56 provided to the vehicle front-rear direction front portion of the blower unit 36, and the flow direction adjustment-flow blower outlet 58 that is formed opposing the main-flow blower outlet 56 in the vehicle front-rear direction, and is provided to the vehicle front-rear direction rear portion of the blower unit 36.

As illustrated in FIG. 2, the setting is such that the airflow F1 blowing out from the main-flow blower outlet 56 flows from the front wall face 52C1 of the inclined wall section 52C of the lower structure body 52, serving as the unit main body lower section, flows along the lower wall section 52A front face, and intersects with the airflow F3 blowing out from the flow direction adjustment-flow blower outlet 58 toward the lower side.

The flow direction adjustment-flow blower outlet 58 is disposed at an upward distance amount of the distance D1 from the vehicle up-down direction height position of the lower wall section 52A of the lower structure body 52, securing the flow of the airflow F3 blowing out from the flow direction adjustment-flow blower outlet 58 along the front wall front face 50E1 of the rear wall section 52E toward the lower side. Furthermore, the flow direction adjustment-flow blower outlet 58 is disposed at an upward distance amount of the distance D1 from the lower wall section 52A of the lower structure body 52, suppressing vortexes from occurring as the airflow F3 converges with the airflow F1 blowing out from the main-flow blower outlet 56.

A portion of the air flowing into the first flow path 44A of the blower unit 36 is thereby blown out from the main-flow blower outlet 56 (described later). As described above, the airflow F1 blowing out from the main-flow blower outlet 56 flows along the front face of the lower wall section 52A of the lower structure body 52 toward the vehicle front-rear direction rear side. When this occurs, what is referred to as the Coandă effect can be obtained in the airflow F1, in which air at the lower side of the airflow F1 is drawn in (the airflow of the drawn-in air is referred to below as "airflow F2").

Namely, in the present exemplary embodiment, the surrounding air can be drawn in, thereby increasing the flow rate of blown air due to the drawing-in phenomenon induced by the Coandă effect. As a result, an airflow (with an airflow quantity of the sum of the airflow F1 and the airflow F2) that exceeds the flow rate blown from the main-flow blower outlet 56 flows in the same direction.

In the present exemplary embodiment, by using the airflow blown from the main-flow blower outlet 56 and the flow direction adjustment-flow blower outlet 58 in this way, air can be blown respectively toward occupants P1, P2 seated in the second row of seats 18 and the third row of seats 20, as illustrated in FIG. 7.

Specifically, in a state in which the damper 48 illustrated in FIG. 1 is fully open, another portion of the air flowing into the first flow path 44A of the blower unit 36 flows through the second flow path 44B and into the third flow path 44C. After flowing along the guide ribs 62, 64, the air that flowed into the third flow path 44C of the blower unit 36 is then blown out from the flow direction adjustment-flow blower outlet 58.

As illustrated in FIG. 2, the airflow F3 blown out from the flow direction adjustment-flow blower outlet 58 is blown out downward. The airflow F3 blown out from the flow direction adjustment-flow blower outlet 58 then converges from the sides of the airflow F1 blown out from the main-flow blower outlet 56, and of the airflow F2 arising by the drawing-in phenomenon induced by the airflow F1.

As a result, the flow direction of the airflow F1 blown out from the main-flow blower outlet 56, and the airflow F2 caused by the drawing-in phenomenon, changes (the airflow with deflected flow direction is referred to below as an "airflow F4"). Namely in the state in which the damper 48 is fully open, the airflow F4 is generated toward the occupants P1 seated in the second row of seats 18 (refer to FIG. 7).

Moreover, in a state in which the damper 48 illustrated in FIG. 1 is fully closed, the airflow flowing into the first flow path 44A is less liable to flow through the second flow path 44B and into the third flow path 44C. As a result, as illustrated in FIG. 2, the flow rate of the airflow F1 blowing out from the main-flow blower outlet 56 increases, and conversely, the flow rate of the airflow F3 blowing out from the flow direction adjustment-flow blower outlet 58 decreases.

As a result, the airflow F1 and the airflow F2 blowing out from the main-flow blower outlet 56 flow toward the vehicle rear side without being greatly impacted by the airflow F3 blowing out from the flow direction adjustment-flow blower outlet 58. An airflow F4' thereby flows toward the occupants P2 (refer to FIG. 7) seated in the third row of seats 20. Accordingly, no separate fin or the like is required to adjust the flow direction in the present exemplary embodiment.

In the present exemplary embodiment, as illustrated in FIG. 1, plural guiding members 60 (two in the present exemplary embodiment) are provided to the first flow path 44A side. The guiding members 60 are supported by the fixed shafts 66 and the movable shafts 68, and the fixed shafts 66 are fixed in the vicinity of the main-flow blower outlet 56. The guiding members 60 are disposed in the first flow path 44A in directions intersecting with the airflow F0 flow direction.

As a result, the flow direction of the airflow F0 flowing along the vehicle width direction is deflected by the guiding members 60, guided toward the vehicle front-rear direction front side, and blown out from the main-flow blower outlet 56. As illustrated in FIG. 2, the airflow F1 blows out from the main-flow blower outlet 56 in a state deflected along the vehicle width direction, then flows along the front face of the lower wall section 52A of the lower structure body 52 toward the vehicle front-rear direction rear side.

As illustrated in FIG. 5, the movable shaft 68 that supports the length direction other end portion of the guiding member 60 is movable along the flow direction of the airflow F0. As a result, by turning the lever 78 provided to the lower structure body 52 and exposed to the cabin 14 side, the movable shaft 68 slides, through the guide groove 70, along the vehicle width direction. The distance between the movable shaft 68 and the fixed shaft 66 thereby changes, changing the curvature of the front face 60A of the guiding member 60.

Specifically, in a state in which the lever 78 is disposed along vehicle front-rear direction (a standard position P), the airflow F0 flows through the guiding members 60 and is blown out from the blower outlet as the airflow that is the airflow F1, that is led toward the vehicle front-rear direction rear side (an airflow F1a). Note that, in this case, the curvature of the front face 60A of the guiding member 60 is a curve 60A0. In this state, the front face 60A of the guiding member 60 adopts a slack state.

Next, when the lever 78 that is in the standard position P is turned toward the vehicle width direction center side (an L position side), the cord 76 and the fixed pulley 74 rotate in an arrow A direction due to the fixed pulley 72. This is accompanied by sliding movement of the movable shaft 68 inside the guide groove 70 toward the vehicle width direction outside (the arrow A direction). The movable shaft 68 thereby nears the fixed shaft 66, the front face 60A of the guiding member 60 slackens greatly, and the curvature increases (a curve 60A1). In this state, the airflow F0 flows through the guiding members 60, and the airflow F1 is led (deflected) toward the vehicle width direction center side (an airflow F1b).

When the lever 78 that is in the standard position P is turned toward the vehicle width direction outside (an R position side), through the fixed pulley 72, the cord 76 and the fixed pulley 74 rotate toward an arrow B direction. This is accompanied by sliding movement of the movable shaft 68 inside the guide groove 70 toward the vehicle width direction center side (the arrow B direction). The movable shaft 68 is thereby distanced from the fixed shaft 66, the front face 60A of the guiding member 60 is extended, and the curvature decreases (a curve 60A2). In this state, the airflow F0 flows through the guiding members 60, and the airflow F1 is led (deflected) toward the vehicle width direction outside (an airflow F1c).

Turning the lever 78 along the vehicle width direction in this way enables the airflow F1 blowing out from the main-flow blower outlet 56 to be deflected along the vehicle width direction (within a range of from F1b to F1c). Namely, changing the curvature of the front face 60A of the guiding members 60 enables the airflow F1, that is deflected toward a direction (the vehicle front-rear direction front side) along the front face 60A of the guiding members 60 that is substantially orthogonal to the airflow F0 flow direction, to be further deflected along the airflow F0 flow direction (along the vehicle width direction).

In this way, in the present exemplary embodiment, the airflow F1 blown out from the main-flow blower outlet 56 can be deflected toward the vehicle front-rear direction rear side and toward the vehicle width direction. Namely, the function of what is referred to as a fin is obtainable by deforming the guiding members 60. To explain the airflow F0 in more detail, the airflow F0 is deflected toward the vehicle front-rear direction front side by the guiding members 60. As illustrated in FIG. 2, since the main-flow blower outlet 56 is open toward the vehicle up-down direction lower side, the airflow F0 is deflected toward the vehicle front-rear direction front side, then led (deflected) toward the vehicle up-down direction lower side, and furthermore led toward the vehicle front-rear direction rear side (the airflow F1) along a front face of the fan cover 26.

In the present exemplary embodiment, as illustrated in FIG. 5, by moving the movable shaft 68 along the airflow F0 flow direction (the one direction) and changing the distance between the movable shaft 68 and the fixed shaft 66, thus changing the curvature of the front face 60A of the guiding member 60, the airflow F0 is deflected toward the vehicle front-rear direction rear side and toward the vehicle width direction.

Figure 8A:
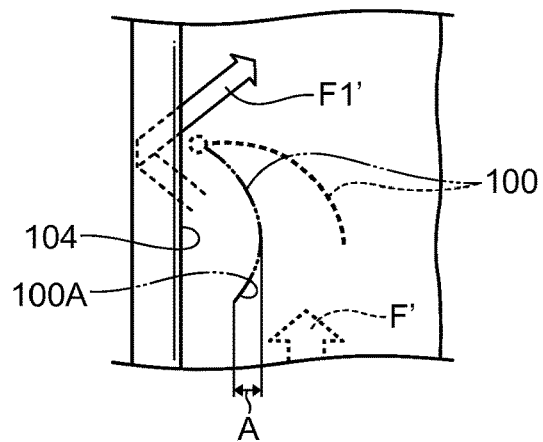
FIG. 8A is a Comparative Example corresponding to FIG. 5.

In contrast, as illustrated in FIG. 8A for example, when trying to deflect an airflow F' using a guiding member 100 that is incapable of deformation, the guiding member 100 is turned about a fixed shaft 102. Viewed along a flow direction of the airflow F', when trying to deflect the airflow F' toward an arrow F1' direction, a portion of the guiding member 100 overlaps with another portion in a region A. As a result, a portion of the airflow F' is guided along a back face 100A side of the guiding member 100, and is led toward a direction that is different to the desired deflection direction.

Figure 8B:
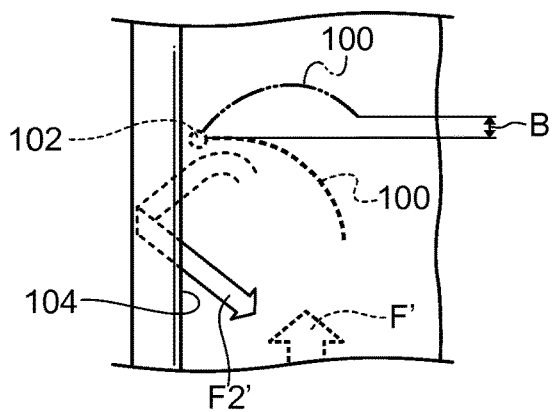
FIG. 8B is a Comparative Example corresponding to FIG. 5.

Moreover, as illustrated in FIG. 8B, when trying to deflect the airflow F' toward an arrow F2' direction, an end portion of the guiding member 100 is positioned further toward the airflow F' flow direction downstream side (an arrow B side) than the fixed shaft 102, causing interference with the fixed shaft 102 and an inability to lead the airflow F' to the desired deflection direction as intended.

Figure 8C:
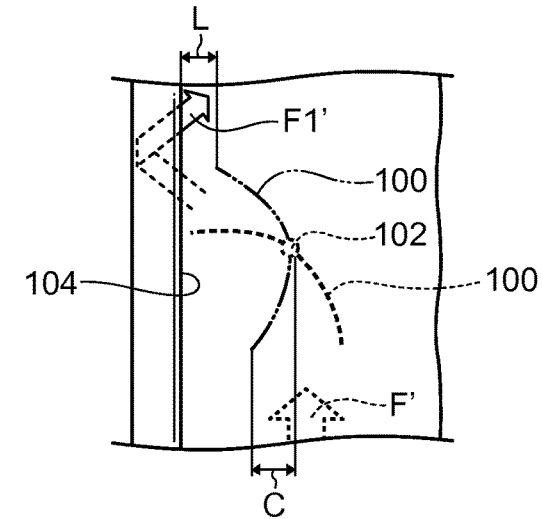
FIG. 8C is a Comparative Example corresponding to FIG. 5.

As illustrated in FIG. 8C, in a case in which the fixed shaft 102 is provided to a length direction center portion of the guiding member 100 that is incapable of deformation, when trying to deflect the airflow F' to the arrow F1' direction, one length direction end portion of the guiding member 100 is distanced (L) from a main stream outlet 104, and the airflow F' cannot be led to the desired deflection direction as intended. Moreover, in a region C, a portion of the guiding member 100 overlaps another portion thereof. As a result, a portion of the airflow F' is led in a direction that is different to the desired deflection direction.

Namely, in configurations such as those above, there is a possibility of increased pressure loss and decreased flow rate of the airflow F' guided by the main spout 104, In the present exemplary embodiment, as illustrated in FIG. 5, one length direction end portion of the guiding member 60 is formed with the fixed shaft 66, and the other length direction end portion is formed with the movable shaft 68, and the movable shaft 68 is moved along the airflow F0 flow direction. The curvature of the front face 60A of the guiding member 60 is thereby changed (60A1, 60A0, 60A2), the airflow F0 that flows along the vehicle width direction is deflected toward the vehicle front-rear direction front side (airflow F1), and also deflected along the vehicle width direction (airflows F1c, F1a, F1b).

As a result, no one portion of the guiding member 60 overlaps with another portion, and the above issue does not occur. This enables the flow rate of the deflected airflows F1c, F1a, F1b to be made approximately constant, without being constrained by the deflection amount (curvatures 60A1, 60A0, 60A2) of the guiding member 60

Moreover, in the present exemplary embodiment, the movable shaft 68 that supports the guiding member 60 is connected to the lever 78 provided at the cabin 14 side, and the movable shaft 68 moves along the airflow F0 flow direction due to turning of the lever 78. As a result, the movable shaft 68 slides when the lever 78 is operated. The distance of the movable shaft 68 thereby changes with respect to the fixed shaft 66 that, together with the movable shaft 68, supports the guiding member 60, enabling the curvature of the guiding member 60 to be easily changed.

Furthermore, in the present exemplary embodiment, the fixed shaft 66 is disposed to the main-flow blower outlet 56 side that is an outlet of the deflected airflow F1. Occurrence of a blow-out noise due to movement of the shaft portion can thereby be suppressed compared to cases in which the movable shaft 68 is disposed to the main-flow blower outlet 56 side. "Blow-out noise" used herein refers to, for example, noise occurring due to differences in strength, or turbulence, of the blow-out due to narrowing and widening of the blower outlet. Note that it goes without saying that the movable shaft 68 may be disposed on the main-flow blower outlet 56 side.

<Modified Example of the Present Exemplary Embodiment>

In the present exemplary embodiment, as illustrated in FIG. 5, the fixed pulleys 72, 74 and the cord 76 are employed, the lever 78 is connected to the fixed pulley 72, and the lever 78 is turned manually to make the movable shaft 68 slide. However, is it sufficient for the movable shaft 68 to be capable of being moved in the airflow F0 flow direction, and configuration is not limited thereto.

Figure 6:
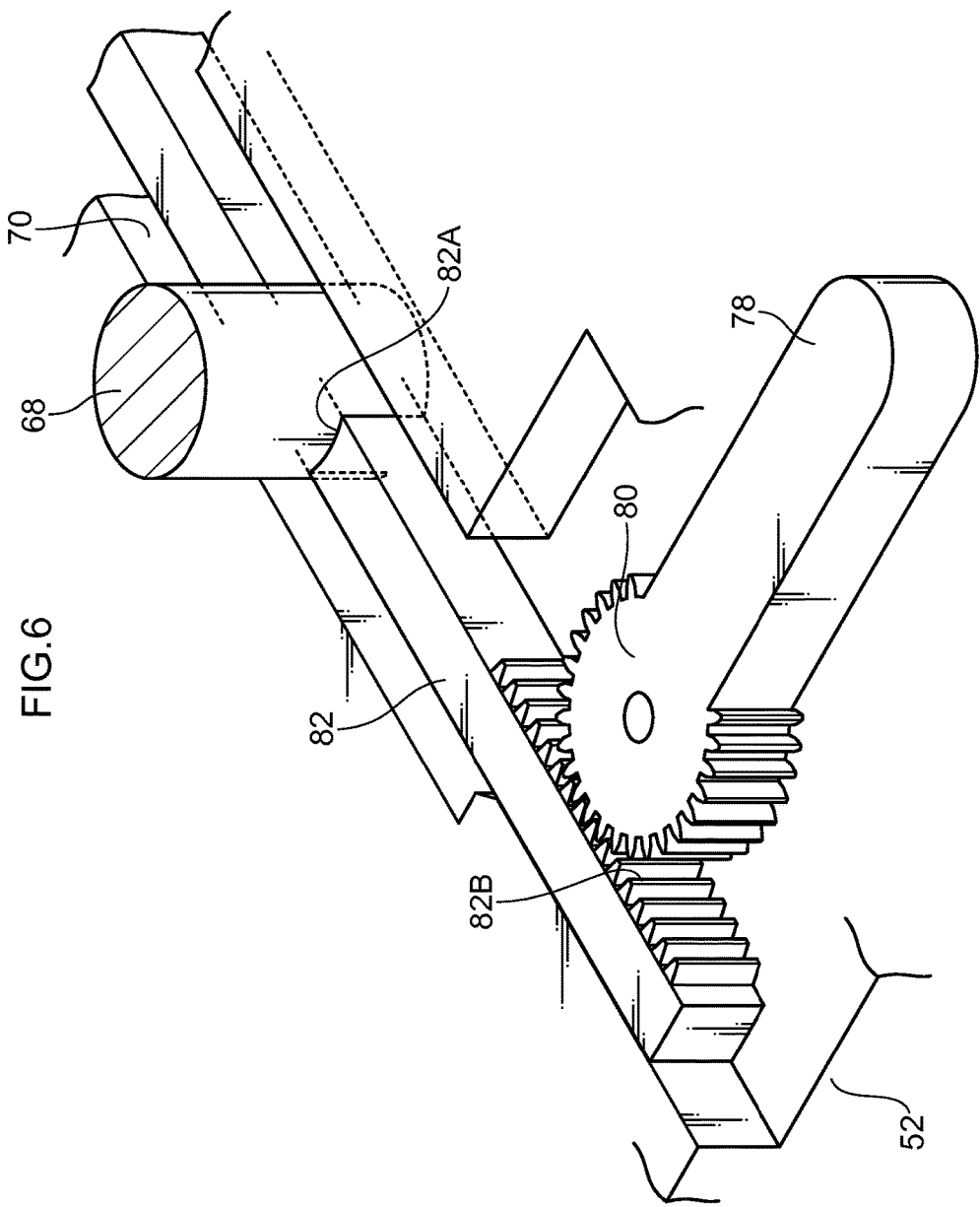
FIG. 6 is partial enlarged perspective view illustrating a Modified Example of a vehicle air conditioning unit of the present exemplary embodiment.

For example, as illustrated in FIG. 6, the turning movement may be converted to a linear movement by a sector gear 80 and a rack 82. Specifically, the rack 82 is slidably accommodated in a guide groove 70, and an end portion of each movable shaft 68 is fitted into respective plural fitting holes 82A formed to the rack 82. The movable shafts 68 are thereby capable of sliding movement when the rack 82 slides. Moreover, the sector gear 80 meshes with a gear portion 82B of the rack 82. The sector gear 80 is coupled to a lever 78, and the sector gear 80 is turned by turning the lever 78. This is accompanied, through the gear portion 82B, by sliding movement of the rack 82 and the movable shafts 68.

Note that, although not illustrated in the drawings, configuration may be such that a reversible pulse motor is connected to a lever 78, and the lever 78 is turned at a specific angle through the pulse motor by a switch disposed, for example, on a lower structure body 52.

Moreover, in the above configurations, the lever 78 and the movable shaft 68 are indirectly connected. However, although not illustrated in the drawings, a movable shaft 68 may be slid by directly connecting a lever to a lower end portion of the movable shaft 68 and sliding the lever. Note that in this case, adjacent movable shafts 68 are connected together by a rod.

Moreover, although in the present exemplary embodiment the blower unit 36 is equipped with the flow path 44 configured including the first flow path 44A, the second flow path 44B and the third flow path 44C, as illustrated in FIG. 1, it is sufficient in the present invention to have at least one blower outlet blowing out airflow deflected by an airflow deflection member. As a result, for example, the second flow path 44B and the third flow path 44C are not always needed for the flow path 44.

Moreover, although an example has been explained in the present exemplary embodiment of application to a ceiling air conditioning unit as a vehicle air conditioning unit 10, configuration is not limited thereto. For example, it goes without saying that a vehicle air conditioning unit according to the present invention may be applied instead of a register, disposed to an instrument panel 84, or a side door (not illustrated in the drawings). Applying the vehicle air conditioning unit to the instrument panel 84, or side door, or the like is particularly advantageous in enabling the function of a fin to be secured while saving space and enhancing styling properties.

In the case of the ceiling air conditioning unit, plural guiding members 60 are disposed along the vehicle width direction, thereby requiring the plural guiding members 60 to be moved at approximately the same time. This results in the need for a configuration to transmit motive force, such as the fixed pulleys 72, 74. However, when an air conditioning unit of the present invention is applied instead of a resistor, such a motion transmission mechanism is not required when a single guiding member 60 suffices.

Moreover, in the present exemplary embodiment, as illustrated in FIG. 5, one length direction end portion of the guiding member 60 is supported by the fixed shaft 66, and the other end portion is supported by the movable shaft 68. However, it is sufficient to have a configuration in which two shaft portions supporting a guiding member 60 are capable of movement relative to each other. As a result, one shaft portion is not necessarily a fixed shaft. Although not illustrated in the drawings, a configuration in which two shaft portions are both movable enables the amount of shaft portion movement to be reduced, while obtaining a similar displacement amount of the guiding member 60.

Moreover, although an example has been provided in the present exemplary embodiment of a guiding member 60 formed of a resilient member such as a rubber member or a synthetic resin, configuration is not limited thereto, and any member that bends and deforms due to airflow is sufficient. For example, a fabric member may be used, such as one made from canvas. Using a fabric member as a guiding member enables a fuzzy airflow to be formed by the airflow guided by the fabric member due to flapping of the fabric member.

Moreover, although in the above exemplary embodiment an example has been given of a so-called minivan type vehicle with three rows of seats as the vehicle 12 equipped with the vehicle air conditioning unit 10, as illustrated in FIG. 7, it goes without saying that the vehicle may also be a sedan type vehicle with two rows of seats.

Although an exemplary embodiment of the present invention has been explained above, the present invention is not limited thereto, and it goes without saying that various other modifications may be implemented within a range not departing from the spirit of the present invention.

The invention claimed is:

1. A vehicle air conditioning unit comprising:
   a fan that operates to generate an airflow;
   a flow path member that guides the airflow generated by the fan along one direction, and that includes a flow path member outlet formed along the one direction; and
   an airflow deflection member that is disposed inside the flow path member at an orientation intersecting with the one direction, that includes a guiding member guiding by deflecting at least a portion of the airflow toward the flow path member outlet, and changes a direction of at least a portion of the airflow introduced from the fan to the guiding member by deforming a curvature of a front face of the guiding member, resulting from moving a farther side of the guiding member from the flow path member outlet with respect to another side of the guiding member, wherein
   the vehicle air conditioning unit is configured such that the airflow blowing out from the flow path member outlet flows along a front face of a unit main body, and the vehicle air conditioning unit includes another flow path member outlet downstream of the flow path member outlet that is disposed at the unit main body opposing the flow path member outlet, and that blows out an airflow that intersects with the airflow blowing out from the flow path member outlet so that at least two airflows blow resepectively in directions different from the airflows blowing out from the flow path member outlet and another flow path member outlet.

2. The vehicle air conditioning unit of claim 1, wherein the airflow deflection member includes:

one shaft portion that is provided to the guiding member at one end portion of the airflow deflection member along a direction intersecting with the one direction, and that supports the guiding member;

another shaft portion that is provided to the guiding member at another end portion of the airflow deflection member along the direction intersecting with the one direction, and that supports the guiding member; and a movement member that moves at least one of the one shaft portion or the other shaft portion along the one direction, and changes a curvature of a front face of the guiding member.

3. The vehicle air conditioning unit of claim 2, wherein the one shaft portion is a fixed shaft disposed at a flow path member outlet side, and the other shaft portion is a movable shaft that is movable with respect to the fixed shaft.

4. The vehicle air conditioning unit of claim 3, wherein the movement member includes:

a guide portion that is formed along the one direction to a wall face configuring a portion of the flow path member, and with which an end portion of the movable shaft engages; and an operating portion that is connected to the movable shaft, that is provided to a unit main body, and that moves the movable shaft along the guide portion.

5. The vehicle air conditioning unit of claim 1, wherein the guiding member maintains a state of deflection while the fan generates an airflow.

* * * * *